United States Patent [19]

Schurman

[11] Patent Number: 5,183,673
[45] Date of Patent: Feb. 2, 1993

[54] APPARATUS FOR CONTROLLING WEIGHT AND WALL THICKNESS OF A BLOW MOLDED ARTICLE

[75] Inventor: Peter T. Schurman, Woodbridge, Conn.

[73] Assignee: The Plastic Forming Company, Inc., Woodbridge, Conn.

[21] Appl. No.: 720,943

[22] Filed: Jun. 25, 1991

Related U.S. Application Data

[62] Division of Ser. No. 499,018, Mar. 26, 1990, Pat. No. 5,061,417.

[51] Int. Cl.⁵ .............................................. B29C 49/48
[52] U.S. Cl. .................................... 425/522; 425/538
[58] Field of Search ............... 264/527, 536, 540, 37, 264/40.7, 40.1, DIG. 33; 425/532, 538, 525, 522, 806

[56] References Cited

U.S. PATENT DOCUMENTS

| | | | |
|---|---|---|---|
| 3,317,955 | 5/1967 | Schurman | 264/527 |
| 3,796,780 | 3/1974 | Schurman | 264/540 |
| 3,886,645 | 6/1975 | Schurman | 264/540 |
| 4,332,750 | 6/1982 | Roggenburg, Jr. et al. | 264/536 |
| 4,738,612 | 4/1988 | Kikuchi et al. | 264/540 |
| 4,773,147 | 9/1988 | Schurman | 264/536 X |

FOREIGN PATENT DOCUMENTS 54-043270  4/1979  Japan ................................... 264/540

Primary Examiner—Richard L. Chiesa
Attorney, Agent, or Firm—St.Onge Steward Johnston & Reens

[57] ABSTRACT

A mold for controlling the weight and wall thickness distribution in a blow molded plastic manufactured article or a family or related articles involves simultaneous formation of the manufactured article and a waste article. The waste article is removed and recycled to manufacture further articles. The waste article forming chamber increases the apparent depth of the manufactured article chamber to create a larger apparent surface area, so that the parison is being blown over a much larger surface area, creating a reduced actual part weight and actual wall thickness.

14 Claims, 4 Drawing Sheets

APPARATUS FOR CONTROLLING WEIGHT AND WALL THICKNESS OF A BLOW MOLDED ARTICLE

This is a divisional application of application Ser. No. 499,018 filed Mar. 26, 1990 and now U.S. Pat. No. 5,061,417.

FIELD OF THE INVENTION

The present invention relates to a mold and process for manufacturing blow molded articles that permit the control of the weight and wall thickness distribution of a blow molded article.

BACKGROUND OF THE INVENTION

The typical process of blow molding a plastic manufactured article involves the steps of downwardly extruding a section of a tubular parison of thermoplastic polymeric material from an extrusion head, sealing the opposite ends of the parison section to confine a volume of air to keep the parison from collapsing on itself, and then transferring the parison section to a mold, where it is clamped between mating mold halves on a blow molding machine. The mold consists of two halves which are opposingly separable along a vertical line. The mold halves define a mold chamber. Air is then injected into the parison section to expand it against the mold chamber to shape the manufactured article. The molded manufactured article is allowed to cool for a short period of time and then removed from the mold.

The resulting manufactured article is thus a hollow article, i.e., of double wall construction. Where a container such as a case is being made, typically two manufactured articles, a base and a lid, will be molded, and they are assembled together to form the case.

In instances where related non-identical articles, such as the lid and base of a case, are to be manufactured, they are made in a multichamber mold known as a "family mold", which allows two different manufactured articles to be made simultaneously from the same parison section.

The use of a multichamber family mold is desirable because it allows for simultaneous formation at a single workstation of related manufactured articles such as a lid and base of a case, which provides economies of labor and in-process storage and handling, and also simplifies control of the parison extrusion conditions. It is readily apparent that the separate sequential manufacture (or simultaneous manufacture in two separate workstations) of a certain number of lids followed by a certain number of bases in separate single chamber lid molds and base molds will require more man-hours than if the lids and bases were made at the same time at the same work station. Further, if the lids and bases are being made at the same time, quality control is simplified, since the polymeric extrusion that creates the parison section will be more consistent in its quality, temperature, thickness and length than if lids and bases are made in separate molding runs.

However, multichamber molds have disadvantages when articles of different depths are being manufactured. Different depth lids and bases are quite common, for example, in the manufacture of a camera case, or other specialized case designs where a deep base is to be assembled with a shallow lid.

The problem with manufacturing articles such as a lid and base of different surface areas in a multichamber mold is that substantially the same areas of a parison section are used to form the lid as the base. However, a deeper base will have a greater surface area than the lid. Consequently, since a similar amount of parison material is being stretched over a larger area in the base than the lid, the lid walls would be thicker than the base walls. In order for the base to meet minimum manufacturing specifications for wall thickness, the lid walls will be thicker than necessary or desirable. This is a waste of the polymeric material. When a large number of cases are being manufactured, the cost of wasted material can be substantial. In addition, an excessively thick lid is more likely to warp and/or present an unpleasant appearance. Moreover, the excess material increases the weight of the product, increasing shipping and delivery costs. Moreover, a thinner wall may often be used in a shallow lid than is necessary in a deeper base. It may in some instances be desirable to mold a lid which has thinner walls than the base to reduce material costs.

The problem of unequal depth lids and bases is somewhat ameliorated by the tendency of the parison section to sag, by which the weight and thickness of the upper end of a parison section is somewhat less than the lower end. This tendency favors molding a shallower article such as a lid in the upper zone of the multichamber mold, and a deeper article such as a base at the lower zone of a multichamber mold. However, parison sag is usually not sufficient to provide enough variation in weight and wall thickness between the upper and lower parts of the mold when a deep article base is combined with a shallow article.

The problem of excess wall thickness arises in the manufacture of even a single manufactured article. For example, in rectangular and other cornered articles it is necessary to design the mold and set parison extrusion conditions such that the corners have a sufficient wall thickness to provide rigidity and strength to the article. However, in blow molding a rectangular article, the corner areas will be thinner than the flat wall areas because of the mold geometry. The blow molded material is subject to stretching and thinning at the corners because the parison first contacts and adheres to the flat wall areas of the mold and subsequently stretches and thins as it expands into the corner areas. Thus, in the manufacture of such blow molded articles, the mold, parison section and process conditions are designed and selected to provide the desired corner wall thickness. When the desired corner wall thickness is obtained, the sidewalls may be thicker than necessary or desirable.

OBJECTS OF THE INVENTION

It is an object of the present invention to provide a mold and process for manufacturing blow molded articles that permit the control of the weight and wall thickness distribution of the material in a blow molded article.

It is an object of the present invention to provide a mold and process for manufacturing blow molded articles that provides an economy in consumption of the polymeric material used in the manufacture of blow molded articles.

It is an object of the present invention to provide a mold and process for manufacturing blow molded articles that allows the manufacture of a blow molded article having wall sections of varying thickness.

It is an object of the present invention to provide a mold and process for manufacturing blow molded articles that allows the production of parts of varying depth in a family of molds, with a savings of labor and in-process storage costs, and improved quality control.

SUMMARY OF THE INVENTION

In accordance with the invention, a mold for manufacturing a blow molded article comprises mold parts for joining together to define at least one manufactured article forming chamber and at least one waste article forming chamber. This "waste chamber" is adjacent to and connects with at least a portion of the manufactured article forming chamber. The waste chamber receives a portion of the parison and is sized and shaped to provide a manufactured article of selected weight and wall thickness distribution connected to a waste article. The waste article is later separated from the manufactured article or articles.

The waste chamber may surround the entire perimeter of the manufactured article forming chamber or it may be located only in specific areas where it is desirable to create a thinner wall. For example, if the manufactured article forming chamber defines a manufactured article having corner areas and a flat wall area extending between the corner areas, the waste chamber is adjacent to and connected with only the flat wall defining area of the manufactured article forming chamber to provide thinner walls in the flat wall area and thicker walls in the corner areas.

In one embodiment of the invention, the manufactured article forming chamber defines a lid or base of a case to be assembled with a matching base or lid respectively to form a complete case.

A process for manufacturing blow molded manufactured articles in a mold having at least one manufactured article forming chamber and at least one waste article forming chamber adjacent to and connecting with at least a portion of the manufactured article forming chamber, comprises the steps of: blow molding a hollow manufactured article in the manufactured article forming chamber; simultaneously forming a waste article adjacent at least a portion of the manufactured article in the waste article forming chamber; and separating the waste article from the blow molded manufactured article. The waste article is recycled to manufacture a parison section for blow molding of additional articles.

The invention also includes the product of the process described above, and a manufactured article joined with a waste article.

The invention also includes a family of molds for manufacturing blow molded manufactured articles of different size or depth, such as a first manufactured article having a depth and a second manufactured article having a depth less than the depth of the first manufactured article. The family of molds comprise a first mold having mold parts for joining together to define a first manufactured article forming chamber; and a second mold having mold parts for joining together to define a separate second manufactured article forming chamber, and at least one waste article forming chamber adjacent to and connecting with at least a portion of the second manufactured article forming chamber, the waste article forming chamber being of a size and shape selected to provide a second manufactured article of selected weight and wall thickness distribution.

The first and second molds of the family of molds may be joined together to form a unitary mold. Where a unitary mold is used, it is preferable that the unitary mold have upper and lower zones, with the first manufactured article forming chamber being located in the lower zone, and the second manufactured article forming chamber and waste article forming chamber being located in the upper zone.

Where the first manufactured article has a surface area $A_{1sa}$ and the first manufactured article forming chamber has a parting line area $A_{1pa}$, and the first mold has a forming ratio $R_{1f}$ as follows:

$$R_{1f}=A_{1sa}/(2\times A=A_{1pa}); \text{ and}$$

the second manufactured article and waste article have a total surface area $A_{2sa}$ and the second manufactured article forming chamber and waste article forming chamber have a total parting line area $A_{2pa}$, and the second mold has a forming ratio $R_{2f}$ as follows:

$$R_{2f}=A_{2sa}/(2=A_{2pa});$$

it is preferable for the waste article and waste article forming chamber to be sized such that $R_{2f}$ is between about 90% to about 110% of $R_{1f}$, and most preferably $R_{2f}$ is about equal to $R_{1f}$.

Where there is parison sag, and $R_{sag}$ represents a weight ratio determined by the weight of a parison section being blow molded to form the first manufactured article divided by the weight of a parison section being blow molded to form the second manufactured article and waste article, and where $R_{wall}$ represents a ratio of a desired wall thickness of the second manufactured article divided by a desired wall thickness of the first manufactured article, it is preferable that the waste article be sized such that $R_{2f}$ be between about 90% to about 110% of $(R_{1f}\times R_{sag})/R_{wall}$. Most preferably, $R_{2f}$ is about equal to $(R_{1f}\times R_{sag})/R_{wall}$.

The waste article forming chamber may surround the entire perimeter of the second manufactured article forming chamber or it may be located only in specific areas where it is desirable to create a thinner wall.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 3:
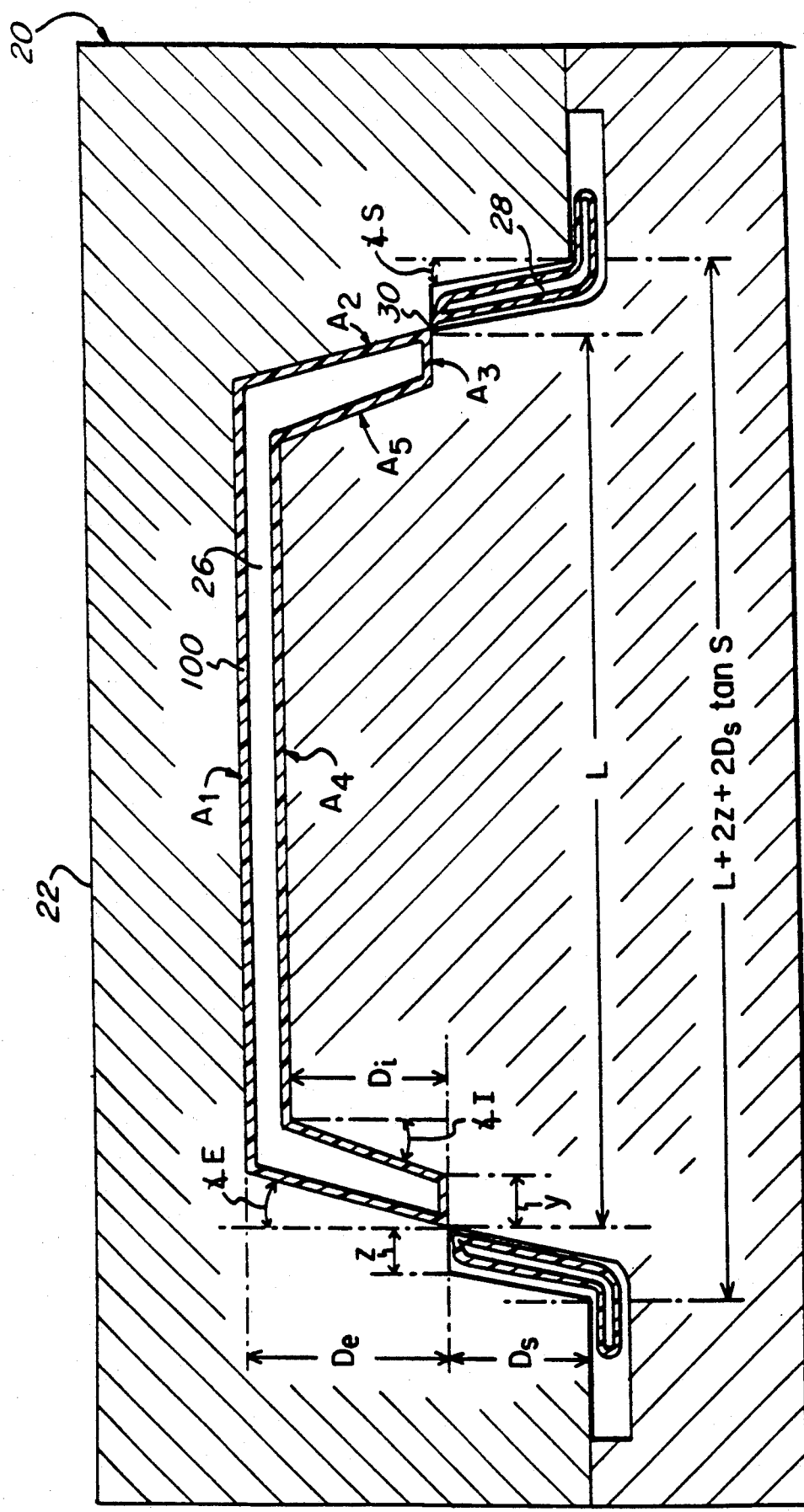
FIG. 3 is a cross-sectional view of a mold in accordance with the invention having a manufactured article forming chamber and a waste article forming chamber.
Figure 4:
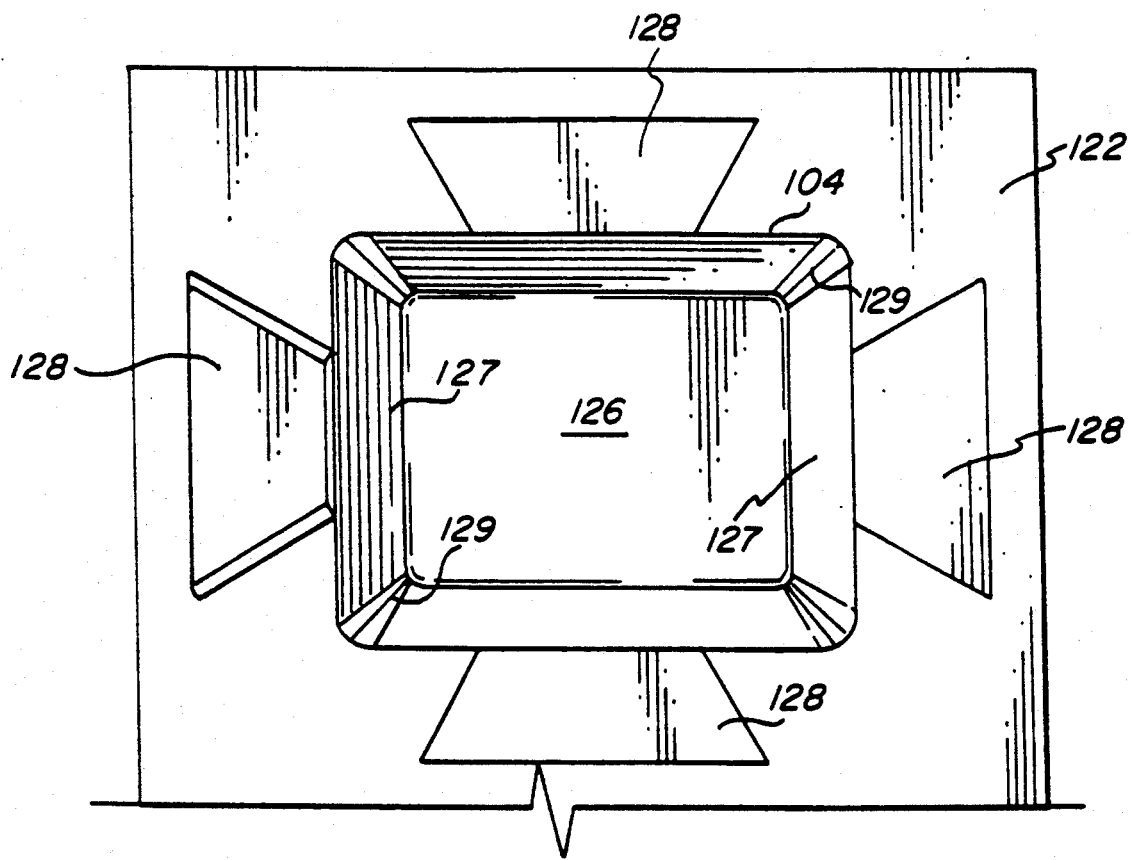
FIG. 4 is a top plan view of a mold half showing a plurality of waste article forming chambers adjacent a manufactured article forming chamber.

Referring now to FIG. 3, a mold 20 comprises two mold parts 22 and 24. Mold part 22 is a mold cavity and mold part 24 is a mold core. Mold parts 22 and 24 define a manufactured article forming chamber 26 and a waste article forming chamber 28. As used herein a "waste article forming chamber" is meant to encompass both a single such chamber 28 as shown in FIG. 3 as well as a plurality of such waste article forming chambers 128 as shown in FIG. 4.

The manufactured article forming chamber 26 connects with and is adjacent to the waste article forming chamber 28. Although the Figures show that the mold parts 22 and 24 are flush together and that there are no passages connecting the chambers 26 and 28, in practice the mold parts 22 and 24 are held together by hydraulic or pneumatic pressure, and as air is injected into a blow molding parison, the air is forced out along the parting line 30 between the mold parts 22 and 24. Accordingly, the manufactured article forming chamber 26 is in communication and connects with the waste article forming chamber 28 when the mold is in operation.

Figure 5:
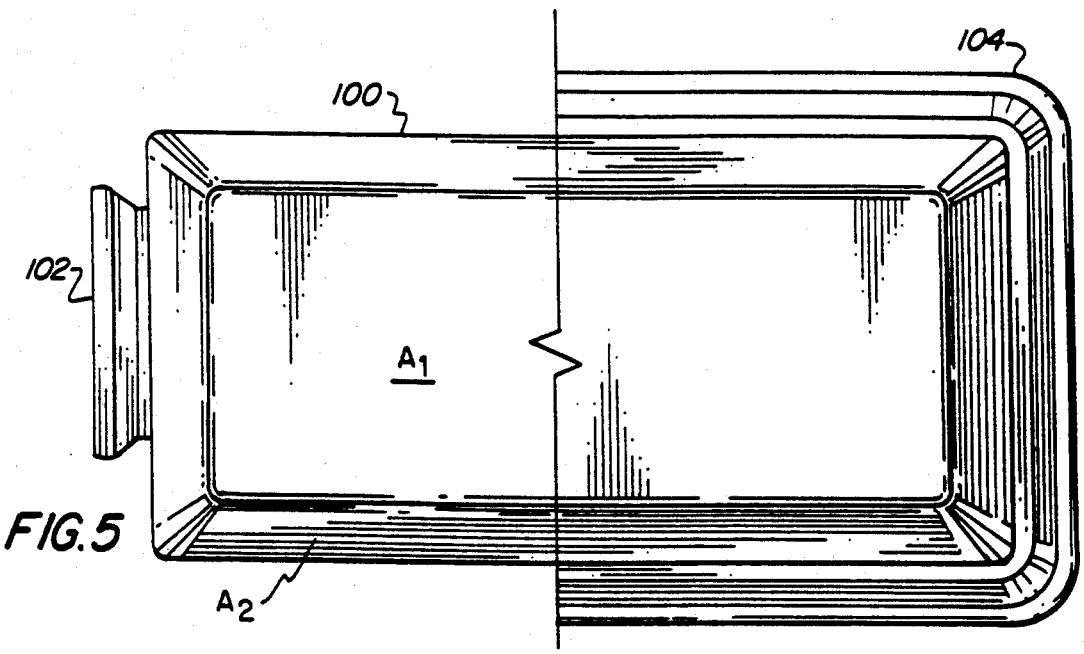
FIG. 5 is a top plan view of a manufactured article with a discontinuous waste article of the type made in the mold of FIG. 4 on the left side thereof, and a continuous waste article on the right side thereof.
Figure 6:
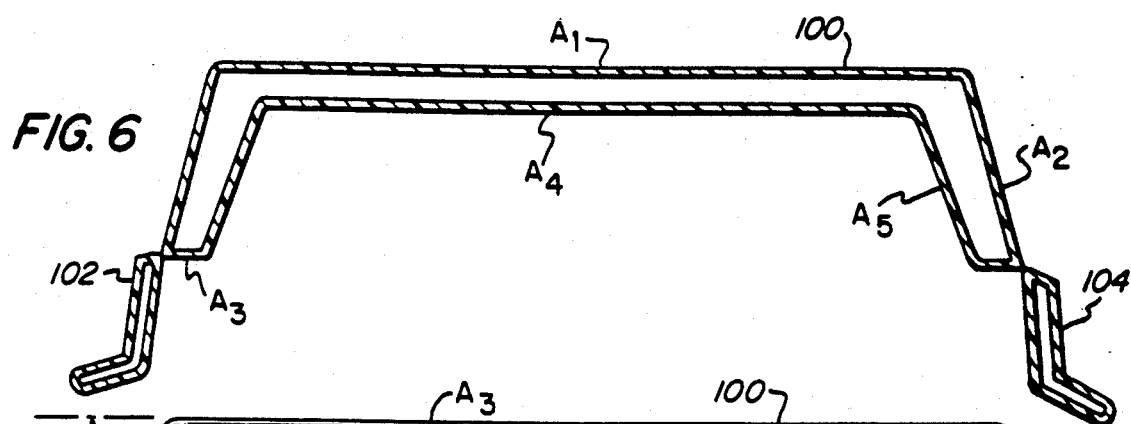
FIG. 6 is a cross-sectional view of the manufactured article of FIG. 5 attached to the waste article(s) of FIG. 5.
Figure 7:
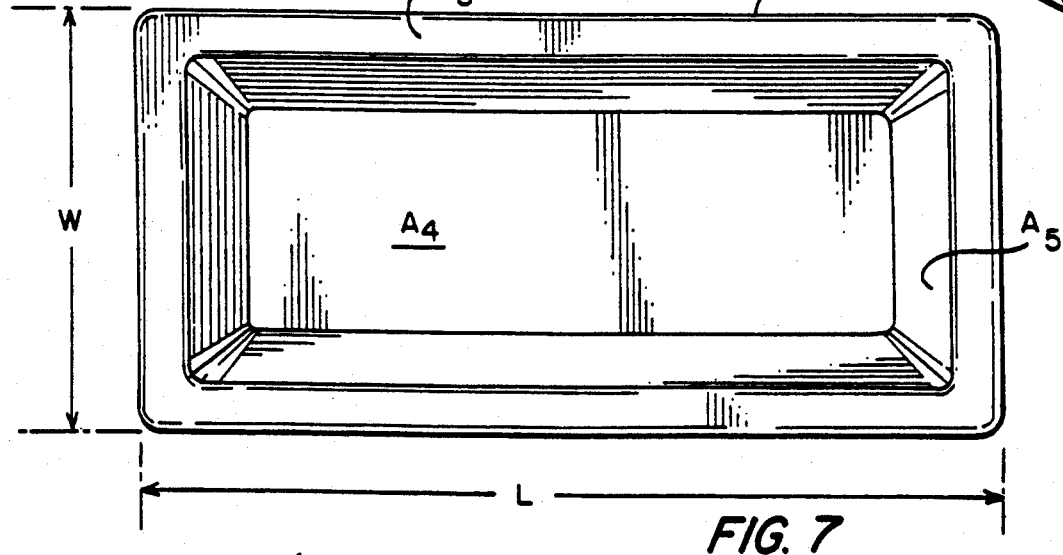
FIG. 7 is a bottom plan view of the manufactured article of FIG. 5 with the waste article(s) removed.

The waste article forming chamber 28 is sized and shaped to provide a manufactured article 100 as shown in FIGS. 5-7 of a selected weight and wall thickness distribution connected to a waste article 102 or 104. The waste article 102 or 104 is separable from the manufactured article 100. The waste article forming chamber 28 may surround the entire perimeter of the manufactured article forming chamber 26, in which case the waste article 104 shown on the right side of FIG. 5 surrounds the perimeter of the manufactured article 100. The waste article chamber may be a single chamber or plurality of chambers 128 located adjacent only a portion of the manufactured article chamber 26, creating a separate waste article 102 or a plurality of such waste articles, as shown in the left side of FIG. 4.

It is to be appreciated that the concept of the invention has application in any situation where it is desired to engineer an article having variable wall thicknesses, for example by locating the waste article forming chamber adjacent the areas where a thinner wall section is desired.

The presence of a waste article forming chamber allows the control of the wall thickness and weight distribution in the blow molded article. It is believed that there are three related reasons for this effect. One is the effect of the mold geometry. By increasing the surface area of the blown article relative to the parting line area (the area of the parison section within the mold chamber) the parison is stretched over a larger area in selected zones, forming a thinner wall in that zone. In addition, there is a tendency for the parison material used to blow mold the manufactured article to flow and be stretched out to form a thinner wall as parison material is forced into the waste article forming chamber by air pressure. Also, the parison material may adhere to the portions of the mold core which first come in contact with the parison, causing the unadhered portions of the parison to stretch out and thin as the mold closes.

A waste article forming chamber in accordance with the invention will have a substantial surface area and encloses a volume. The volume of the waste article forming chamber is designed to take up a sufficient quantity of material to achieve the desired wall thickness. The volume allows the formation of a hollow, double wall waste article.

The waste article forming chamber(s) may be located only in specific areas where it is desirable to create a thinner wall. For example, if a manufactured article forming chamber defines a manufactured article having corner areas and a flat wall area extending between the corner areas, such as in a case as shown in FIGS. 5-7, the waste article forming chambers 128 as shown in FIG. 4 would be adjacent to and connected with the flat wall defining area 127 of the manufactured article forming chamber 126 to create thinner walls in the flat wall area 127 and thicker walls in the corner areas 129.

In one embodiment of the invention, the manufactured article forming chamber defines a lid or base of a case to be assembled with a matching base or lid respectively to form a complete case.

A process of manufacturing blow molded manufactured articles in a mold 20 having at least one manufactured article forming chamber 26 and at least one waste article forming chamber 28 or 128 adjacent to and connecting with at least a portion of the manufactured article forming chamber 26, comprises the steps of: blow molding at least one hollow manufactured article 100 in the manufactured article forming chamber 26; simultaneously forming at least one waste article 102 or 104 adjacent at least a portion of the manufactured article 100 in the waste article forming chamber 28 or 128; and separating the waste article 102 or 104 from the blow molded manufactured article 100. The waste article 102 or 104 is removed, reground and recycled in the parison extrusion machine to manufacture a parison section for blow molding of additional articles.

The invention also includes the manufactured article made by the process described above, and a manufactured article joined with a waste article.

A blow molded manufactured article will have a "parting line area" ($A_{pa}$) which is the area of the plane which extends through the mold chamber where the mold parts 22 and 24 meet. The parting line area $A_{pa}$ will be about equal to the area surrounded by the manufactured article's outer perimeter. In an embodiment such as a rectangular article 100 as shown in FIG. 7, $A_{pa}$ will equal the manufactured article's length (L) times its width (W).

A blow molded manufactured article will have an outer surface area ($A_{sa}$) determined by the sum of all its wall areas.

In the example of a double wall blow molded rectangular article 100 (which may serve as a case lid or base), $A_{sa}$ equals the sum of the outside face area ($A_1$), the outside sidewall area ($A_2$), the inside parting line flange area ($A_3$), the inside face area ($A_4$), and the inside sidewall area ($A_5$), which are shown in FIGS. 5-7.

The foregoing wall areas may be determined for a rectangular case by the formulae that follow. Reference is made to FIGS. 3 and 5-7 which show the various angles, dimensions and areas used in the calculations.

$$A_1 = (L - 2D_e \tan E) \times (W - 2D_e \tan E)$$
$$A_2 = (2D_e/\cos E) \times (L + W - 2D_e \tan E)$$
$$A_3 = (L + W) - 4y^2$$
$$A_4 = (L - 2y - 2D_i \tan I) \times (W - 2y - 2D_i \tan I)$$
$$A_5 = (2D_i/\cos I) \times (L + W - 4y - 2D_i \tan I)$$
Thus $A_{sa} = A_1 + A_2 + A_3 + A_4 + A_5$.

A "forming ratio" $R_f$ correlates the surface area of a blow molded manufactured article to the approximate surface area of a parison section which will be used to form the finished manufactured article. The forming ratio $R_f$ of the manufactured article will be determined by the total surface area divided by twice the parting line area, i.e. $R_f = A_{sa}/2A_{pa}$. For the example of a rectangular manufactured article 100 this will be calculated as follows:

$$R_f = \frac{A_{sa}}{2A_{pa}} = \frac{(A_1 + A_2 + A_3 + A_4 + A_5)}{2 \times L \times W}$$

It will be appreciated that a deeper manufactured article such as the base of a case will have a higher forming ratio $R_f$ than a shallower manufactured article such as a lid of a case. For example, a typical base having a length (L) of 10.5 inches, a width (W) of 7 inches, a total depth ($D_e$) of 2.25 inches, an interior depth ($D_i$) of 1.9 inches, and a flange width y of 0.5 inches, with an exterior surface $A_2$ having an angle E of 10°, and an interior surface $A_5$ having an angle I of 15°, will have a total surface area ($A_{sa}$) of 252.31 square inches, a parting line area ($A_{pa}$) of 73.5 square inches, and a forming ratio ($R_f$) equal to about 1.72.

A typical matching lid for such a case having a length (L) of 10.5 inches, a width (W) of 7 inches, a total depth ($D_e$) of 0.75 inches, an interior depth ($D_i$) of 0.47 inches, and a flange width y of 0.5 inches, with an exterior surface $A_2$ having an angle E of 15°, and an interior surface $A_5$ having an angle I of 15°, will have a surface area ($A_{sa}$) of 179.48 square inches, a parting line area ($A_{pa}$) of 73.5 square inches, and a forming ratio ($R_f$) equal to about 1.22.

The difference in forming ratios between the base and lid reflects the difference in the areas of the manufactured articles to be formed by the same size parison sections.

In designing for a family of molds where both a lid and a base are to be formed simultaneously from the same parison section, it is preferable to first consider the deeper manufactured article such as a base. Referring to the base of the example, the desired weight of the base will be calculated by multiplying the surface area ($A_{sa}$) of the base by the average weight per area of the base at its desired thickness. For purposes of this example, it is assumed that the case is to be formed from high density polyethylene to achieve a desired average wall thickness of 0.062 inch. High density polyethylene has a weight of about 1.0 grams per square inch at a thickness of 0.062 inch. The base of this example would thus have a weight of 252.31 in$^2 \times$ 1.0 gr./in$^2$ = 252 grams. The parison extrusion conditions would thus be set to provide a parison of the desired weight to obtain this base weight.

Assuming that there is no parison sag, the lid would have the same weight (252 grams) as the base, since it is being made at the same time in a mold chamber having the same parting line area as the base mold chamber. However, the foregoing calculations show that the lid will have a surface area of 179.5 in$^2$, and at a desired wall thickness of 0.062 inch, the lid would have a desired weight of about 179.5 grams.

The disparity between the desired part weight and the obtained part weight is in practice reduced by parison sag. Continuing the example, the multichamber family mold would have its base forming chamber in its lower zone and its lid forming chamber in its upper zone. Typically, parison sag will stretch the parison so that the upper end of the parison used for making the lid will have a weight which is less than that of the lower end of the parison. The difference in weight is expressed as a "sag ratio" ($R_{sag}$), which may be determined by dividing the weight of a manufactured article formed in the upper zone of a family mold by the weight of a manufactured article formed in the lower zone of the same parison section, normalized to the same parting line area $A_{pa}$. In the example, the lid and base have the same parting line area, and a sag ratio $R_{sag}$ for the particular lid and base of the example has been determined empirically to be about 0.85. Accordingly, for a lid having the same parting line area $A_{pa}$ as the described base, the lid would weight about $0.85 \times 252 = 214$ grams.

However, the desired lid weight, using high density polyethylene at a thickness of 0.062 inch, was determined to be about 179.5 grams. Thus, even allowing for parison sag, the lid manufactured in a multichamber family mold would still be about 35 grams, or about 19 percent heavier, and consequently thicker, than desired. Moreover, as already noted, it is sometimes desirable to manufacture a lid part of a lesser wall thickness than the base part, for example, to a lid part weight and wall thickness of about 91 percent of the weight and wall thickness the lid would have if it were equal in wall thickness to the base part. This desired difference in weight and wall thickness is known as a "wall thickness ratio" ($R_{wall}$), which is equal to a desired wall thickness of the lid or other shallower manufactured article divided by the desired wall thickness of the base or other deeper manufactured article. Referring to the example, where the base has an average wall thickness of 0.062 inch, and the wall thickness ratio $R_{wall} = 0.91$, the target lid weight would be $179 \times 0.91$, or about 163 grams. If this is the target weight range, the lid weight in the multichamber family mold would be about 50 grams, or about 30 percent heavier than desired, even allowing for parison sag. It is readily apparent that the excess material used in the lid manufactured in a multichamber family mold represents a substantial material cost. This problem of excess material use and coat arises in all multichamber family mold situations involving two manufactured articles of differing depths.

Figure 1:
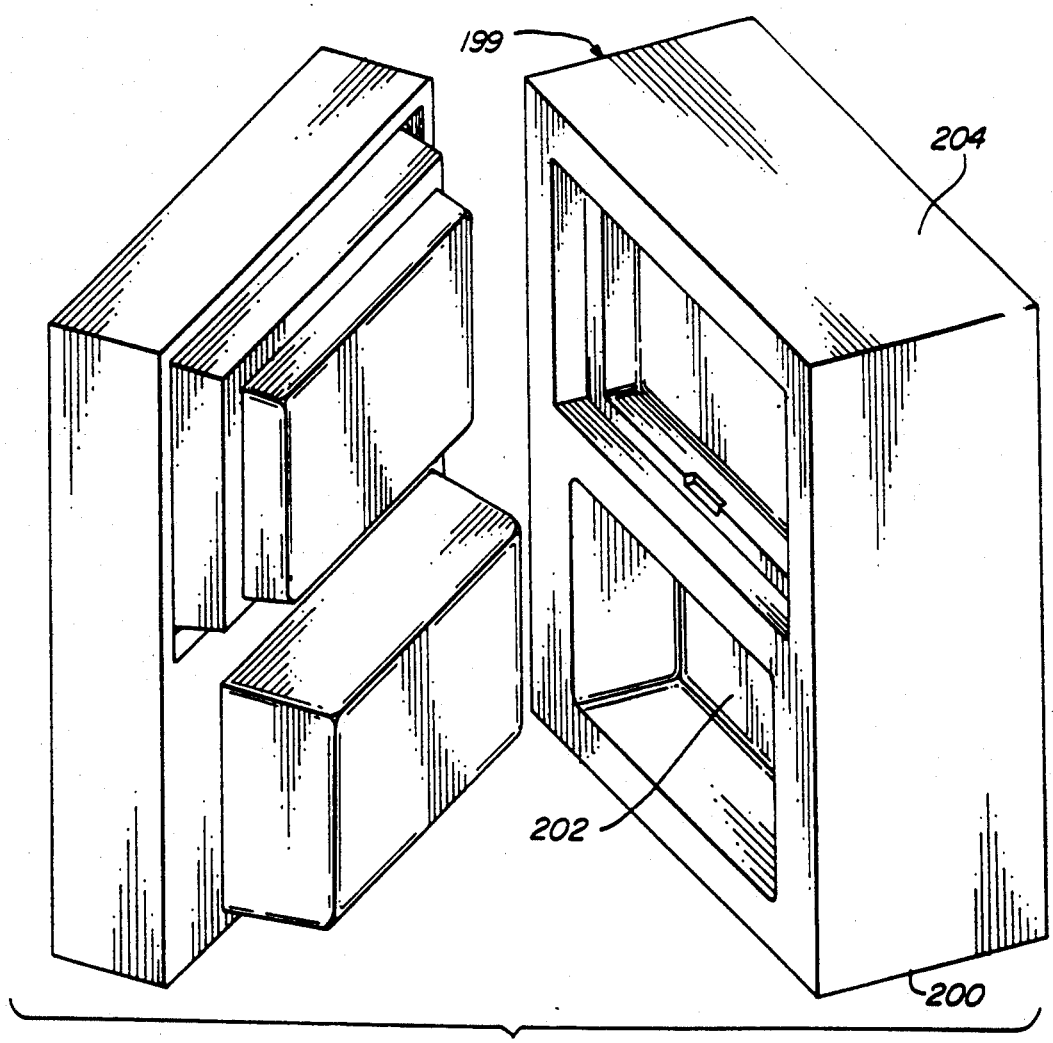
FIG. 1 is a perspective view of an open multichamber family mold in accordance with the invention.

FIG. 1 shows an open multichamber family mold in perspective view. In actual practice the molds will approach each other face to face rather than as if hinged as shown in FIG. 1. The view in FIG. 1 allows a better understanding of the mold parts.

Figure 2:
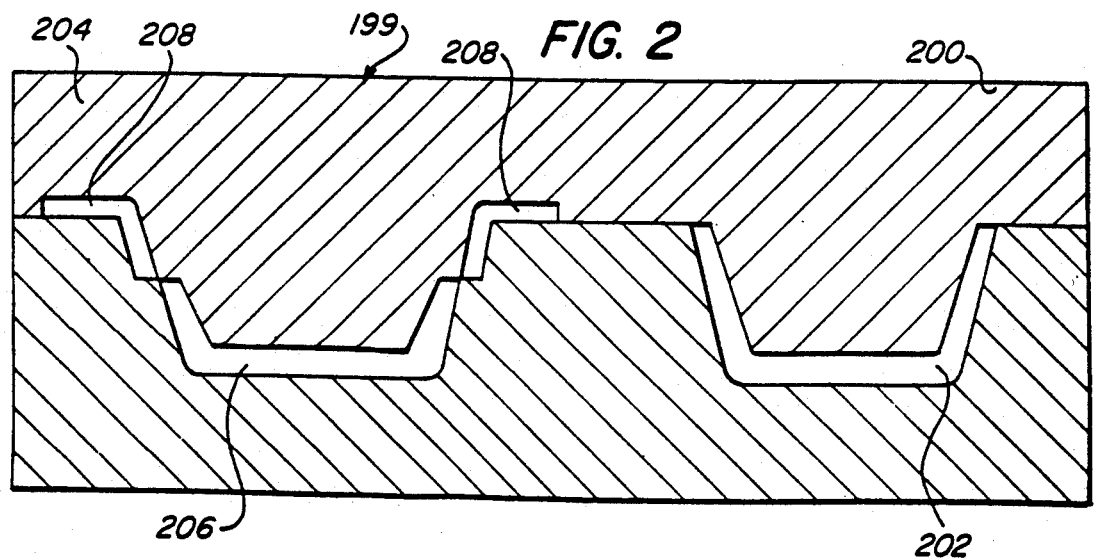
FIG. 2 is a cross-sectional view of a closed multichamber family mold in accordance with the invention.

Referring now to FIGS. 1–2, to reduce th lid weight and wall thickness to the amount desired, a waste article forming chamber 208 or plurality of such chambers are provided adjacent the lid forming chamber 206 in the upper zone 204 of the family mold 199. The waste article forming chamber 208 increases the apparent depth of the lid chamber 206 to create a larger apparent lid surface area $A_{apparent\ sa}$, so that the parison is being blown over a much larger surface area, creating a reduced actual lid part weight and lid actual wall thickness. The lid will also have a larger apparent lid forming ratio $R_{apparent\ f}$.

Returning to the example, the appropriate size of the waste article to be molded is determined by calculating a target apparent lid forming ratio $R_{apparent\ f}$ by multiplying the base forming ratio $R_f$ by the sag ratio and dividing by the wall thickness ratio:

$$R_{apparent\ f} = (R_{bas\ f} \times R_{sag})/R_{wall}.$$

Using the figures of the example:

$$R_{apparent\ f} = (1.72 \times 0.85)/0.91 = 1.60$$

The practitioner of the invention will use the apparent forming ratio as a guide to determining the optimum shape and size of the waste article and the waste article forming chamber.

The foregoing description is not limiting of the invention, which has application in many other situations. The following description sets forth a more general description of the invention as applied to a family of molds using the same Figures.

Referring now to FIGS. 1-2, a family of molds for manufacturing blow molded manufactured articles of different size or depth, including a first manufactured article having a depth and a second manufactured article having a depth less than the depth of the first manufactured article, comprises: a first mold 200 having mold parts for joining together to define a first manufactured article forming chamber 202; a second mold 204 having mold parts for joining together to define a separate second manufactured article forming chamber 206, and at least one waste article forming chamber 208 adjacent to and connecting with at least a portion of the second manufactured article forming chamber 206, the at least one waste article forming chamber 208 being of a size and shape selected to provide a second manufactured article of selected weight and wall thickness distribution manufactured in the second manufactured article forming chamber 206.

The family of molds are configured to manufacture a first manufactured article having a surface area $A_{1sa}$ in a first manufactured article forming chamber 202 having a parting line area $A_{1pa}$, giving a forming ratio $$R_{1f} A_{1sa}/(2 \times A_{1pa}), \text{ and}$$

the second manufactured article and waste article have a total surface area $A_{2sa}$ and the second manufactured article forming chamber 206 and waste article forming chamber 208 have a total parting line area $A_{2pa}$, and the second mold has a forming ratio $$R_{2f} = A_{2sa}(2 \times A_{2pa}).$$

In accordance with the invention, the waste chamber 208 (or plurality of chambers) is sized such that $R_{2f}$ is between about 90% to about 110% of $R_{1f}$. In the most preferred embodiment, $R_{2f}$ is about equal to $R_{1f}$. As used herein, "about equal" means a range of plus or minus 0.05.

In a more preferred embodiment of the invention sag and wall thickness ratios are accounted for, and the waste chamber 208 (or plurality of chambers) is sized such that $R_{2f}$ is between about 90% to about 110% of $(R_{1f} \times R_{sag})/R_{wall}$. In the most preferred embodiment, $R_{2f}$ is about equal to $(R_{1f} \times R_{sag})/R_{wall}$.

$R_{sag}$ represents a weight ratio determined by the weight of a parison section being blow molded to form the first manufactured article divided by the weight of a parison section being blow molded to form the second manufactured article and waste article, and $R_{wall}$ represents a ratio of a desired wall thickness of the second manufactured article divided by a desired wall thickness of the first manufactured article.

The first and second molds may be a single unitary mold or they may be separate molds which are joined together for blow molding to form a unitary mold. A unitary mold 199 is shown in FIGS. 1 and 2. Unitary mold 199 will preferably have upper and lower zones, and the first manufactured article forming chamber 202 will be located in the lower zone, and the second manufactured article forming chamber 206 and waste article forming chamber 208 will be located in the upper zone.

Most preferably, where the practitioner desires to manufacture a case, the first manufactured article forming chamber 202 defines a base of a case, and a second manufactured article forming chamber 206 defines the lid of a case.

As has already been discussed in reference to the single article mold 20, the waste article forming chamber 208 may surround the entire perimeter of the second manufactured article forming chamber 206 or it may be located at selected peripheral areas of the case.

It is to be appreciated that the invention also has application when there are more than two molds in the family of molds, for example where there are three such molds. In such case, normally the desired parameters of the first manufactured article will govern the size of any waste article forming cavities needed to obtain the desired second and third article's weight or wall thickness.

Returning to the example, a waste article chamber is assumed to extend all the way around the lid forming chamber, and assumed to have a thickness z, a depth $D_s$, and is assumed to be angled outwardly at an angle S. These dimensions are shown in FIG. 3 in reference to a waste article forming chamber 28, however, they apply equally to the waste article forming chamber 208 of FIG. 2.

This waste article chamber embodiment would increase the apparent parting line area $A_{apparent\ pa}$ of the lid mold. The apparent lid parting line length $L_{apparent\ pa}$ will be calculated as follows:

$$L_{apparent\ pa} = L + 2z + 2D_s \tan S$$

The apparent lid parting line width $W_{apparent\ pa}$ will be calculated as follows:

$$W_{apparent\ pa} = W + 2z + 2D_m \tan S$$

The apparent parting line area $A_{apparent\ pa}$ of the lid chamber and waste article chamber combined would then be:

$$A_{apparent\ pa} L_{apparent\ pa} \times W_{apparent\ pa}$$

The waste article surface area in this example would be:

$$Waste\ A_{sa} = (2D_s/\cos S) \times (L + W + 2D_s \tan S + 2z)$$

The practitioner will then determine, either by calculus solution or trial and error, a series of waste article dimensions which give the desired lid apparent forming ratio $R_{apparent\ f}$ (which, in the example has been calculated to be 1.60), i.e.:

$$R_{apparent\ f} = \frac{Waste\ A_{sa} + Lid\ A_{sa}}{2 A_{apparent\ pa}}$$

One such solution is provided by a waste article having the following dimensions: thickness z=0.3 inch, angle S=10°, and depth $D_s$=1.25. The waste article would have $A_{sa}$=116.43, the apparent parting line area $A_{apparent\ pa}$ will be 92.78 in², and the apparent lid surface area $A_{apparent\ pa}$ will equal the waste article area $A_{sa}$ plus the lid area $A_{sa}$, which in this case totals 295.91 in².

The apparent forming ratio of the lid and waste article will be:

$$R_{apparent\ f} = A_{apparent\ sa}/2A_{apparent\ pa}$$
$$= 295.91/(2 \times 92.78) = 1.59.$$

This is sufficiently close to the target apparent lid forming ratio previously determined to give the lid its desired weight as next discussed.

The apparent total weight of the lid and waste article obtained in this example will be greater than that of the lid which would have been formed without a waste article. This is due to the increased apparent parting line area which increases the size of the parison section being used to form the lid and waste article. In this example, the apparent parting line area $A_{apparent\ pa}$ is 92.78, which divided by 73.5 (the lid parting line area) gives 1.262, meaning that the apparent parting line area is 26.2% larger than the original parting line area of the lid alone. Assuming a uniform weight distribution, the apparent total weight will also be about 26.2% larger. In this example, the apparent total weight will be 214 grams × 1.262 = 270 grams. (The 214 gram figure represents the weight of the lid calculated allowing for parison sag). This weight will be applied to a total waste article and lid apparent surface area of 295.91 in², of which the lid comprises 179.49 in². The lid thus comprises 60.6% of the total apparent area and thus of the total apparent weight of the waste article and lid. The weight of the lid alone is thus 0.606 × 270 grams = 163.6 grams.

Returning to the initial portion of this example, the desired lid part weight was 163 grams. Thus the addition of the disposable waste article has allowed the lid to be formed at the desired weight and wall thickness. The mold and process of the invention as applied in the example give a savings of 50.4 grams (214 grams − 163.6 grams) in the manufacture of the lid. This represents a very substantial savings of material, and over the course of a production run of 20,000 cases will save over 1,000 kilograms of material, for savings of material cost of over $900.00.

The waste article, in whatever configuration, should allow the blow molding of a manufactured article of a desired weight and wall thickness, and the particular example given is not intended to limit the invention. The waste article may have any of a number of shapes and forms. It may be adjacent only a portion of the manufactured article forming chamber where a thinner wall thickness is desired. It may be polygonal or curved in cross-section. Its purpose is to create an apparent lid surface area that is sufficient to use up excess material.

The present invention also relates to a process of blow molding in a family of molds where at least two manufactured articles of different size or depth are blow molded in separate mold chambers. A first manufactured article is blow molded in the first mold chamber 202, and a second article is blow molded in the second mold chamber 206. The second mold chamber 206 has at least one waste article forming chamber 208 adjacent to and connecting with at least a portion of the second mold chamber 206. The process comprises the steps of: blow molding a first hollow manufactured article in the first mold chamber 202; blow molding a second manufactured article in the second mold chamber 206 while simultaneously forming a waste article adjacent at least a portion of the second manufactured article; and separating the waste article from the second manufactured article.

More particularly, a process in accordance with the invention permits manufacturing blow molded manufactured articles in a multichamber mold comprises the steps of: determining a first manufactured article surface area $A_{1sa}$; determining a second manufactured article surface area $A_{2sa}$; determining a first manufactured article parting line area $A_{1pa}$; determining a second manufactured article parting line area $A_{2pa}$; determining a first manufactured article forming ratio ($R_{1f}$) by the formula $$R_{1f} = \frac{A_{1sa}}{2A_{1pa}};$$

determining a parison sag ratio $R_{sag}$; selecting a wall thickness ratio $R_{wall}$; determining a target apparent second article forming ratio $R_{apparent\ 2f}$ by the formula $$R_{apparent\ 2f} = (R_{1f} \times R_{sag})/R_{wall};$$

determining a waste article size and shape that will give an apparent combined waste article and second article surface area $A_{apparent\ sa}$ and a combined second article and waste article apparent parting line area $A_{apparent\ pa}$ that will give the target apparent second article forming ratio when applied in the formula $$R_{apparent\ f} = (A_{apparent\ sa})/2A_{apparent\ pa};$$

blow molding a first hollow manufactured article in the first mold chamber; blow molding a second manufactured article in the second mold chamber while simultaneously forming a waste article of the size determined adjacent at least a portion of the second manufactured article; and separating the waste article from the at least one second manufactured article.

Accordingly, the mold and process of the invention provide a new and economical method to manufacture blow molded articles, which in particular allow the control of the weight and wall thickness distribution in such articles.

I claim:

1. A family of blow molds for manufacturing at least two blow molded manufactured articles of different depth, including a first manufactured article having a depth and a second manufactured article having a depth which is substantially less than the depth of the first manufactured article, comprising:

a first mold having mold parts for joining together to define a first mold chamber for receiving a portion of a moldable parison to blow mold the first manufactured article;

a second mold having mold parts for joining together to define a separate second mold chamber for receiving a portion of the moldable parison to blow mold the second manufactured article, and at least one waste article forming chamber adjacent to and connecting with at least a portion of said second mold chamber for receiving a portion of the mountable parison and forming at least one separable waste article simultaneously with the blow molding of said second manufactured article, said waste article forming chamber being of a size and shape selected such that a waste article formed in the waste article chamber and the second manufactured article have a total apparent surface area proportional to the total apparent parting line area of the second mold chamber and waste article forming chamber which is a selected percentage of the surface area of the first manufactured article proportional to the parting line area of the first mold chamber, whereby the wall thickness of the first and second manufactured articles are controlled to predetermined thicknesses.

2. A family of molds in accordance with claim 1 wherein said first manufactured article has a surface area $A_{1sa}$ and said first mold chamber has a parting line area $A_{1pa}$, to define a first mold forming ratio $R_{1f}$ as follows:

$$R_{1f}=A_{1sa}/(2\times A_{1pa}), \text{ and}$$

said second manufactured article and waste article have a total surface area $A_{2sa}$ and said second mold chamber and waste article forming chamber having a total parting line area $A_{2pa}$, to define a second mold forming ratio $R_{2f}$, as follows:

$$R_{2f}=A_{2sa}/(2\times A_{2pa}), \text{ and}$$

said second mold forming ratio $R_{2f}$ is between about 90% to about 110% of said first mold forming ratio $R_{1f}$.

3. A family of molds in accordance with claim 2, wherein said second mold forming ratio $R_{2f}$ is about equal to said first mold forming ratio $R_{1f}$.

4. A family of molds in accordance with claim 1 wherein said first manufactured article has a surface area $A_{1sa}$ and said first mold chamber has a parting line area $A_{1pa}$, to define a first mold forming ratio $R_{1f}$ as follows:

$$R_{1f}=A_{1sa}/(2\times A_{1pa}), \text{ and}$$

said second manufactured article and waste article have a total surface area $A_{2sa}$ and said second mold chamber and waste article forming chamber have a total parting line area $A_{2pa}$, to define a second mold forming ratio $R^{2f}$ as follows:

$$R_{2f}=A_{2sa}/(2\times A_{2pa}), \text{ and}$$

$R_{2f}$ is between about 90% to about 110% of $(R_{1f}\times R_{sag})/R_{wall}$, where $R_{sag}$ represents a weight ratio determined by the weight of a parison section being blow molded to form said first manufactured article divided by the weight of a parison section being blow molded to form said second manufactured article and waste article, and where $R_{wall}$ represents a ratio of a desired wall thickness of the second manufactured article divided by a desired wall thickness of the first manufactured article.

5. A family of molds in accordance with claim 4, wherein $R_{2f}$ is about equal to $(R_{1f}\times R_{sag})/R_{wall}$.

6. A family of molds in accordance with claim 1 wherein said second mold chamber has a perimeter, and said waste article forming chamber surrounds the entire perimeter of the second mold chamber.

7. A family of molds in accordance with claim 1 wherein said second mold chamber defines a second manufactured article having corner areas and a wall area extending between the corner areas, and said at least one waste article forming chamber is adjacent to and connected with said wall defining area of said second mold chamber.

8. A family of molds in accordance with claim 1 wherein said first and second molds are joined together to form a unitary mold.

9. A family of molds in accordance with claim 8, wherein said unitary mold has upper and lower zones, and said first mold chamber is located in said lower zone, and said second mold chamber and waste article forming chamber are located in said upper zone.

10. A family of molds according to claim 9, wherein said first mold chamber defines a base of a case, and a second mold chamber defines the lid of a case.

11. A family of molds in accordance with claim 1, further comprising at least one additional mold having mold parts for joining together to define a separate additional manufactured article forming chamber for receiving a portion of a parison section to form an additional manufactured article which has a depth less than that of the first manufactured article, and at least one additional waste article forming chamber adjacent to and connecting with at least a portion of said additional manufactured article forming chamber for receiving a portion of the parison section and forming at least one additional waste article simultaneously with the forming of said additional manufactured article, said at least one additional waste article forming chamber being of a size and shape selected such that a waste article and an additional manufactured article have a total apparent surface area proportional to the total apparent parting line area of the additional manufactured article forming chamber and waste article forming chamber which is a selected percentage of the surface area oft he first manufactured article proportional to the parting line area of the first mold chamber, whereby the wall thicknesses of the first and additional manufactured articles are controlled to predetermined thicknesses.

12. A family of blow molds for manufacturing at least two blow molded manufactured article of different depth, including a first manufactured article having a depth and a second manufactured article having a depth which is substantially less than the depth of the first manufactured article, comprising:

a first mold having mold parts for joining together to define a first mold chamber for receiving a portion of a moldable parison to blow mold the first manufactured article, the first manufactured article having a surface area $A_{1sa}$, said first mold chamber having a parting line area $A_{1pa}$, said first mold having a first mold forming ratio $R_{1f}$ defined as follows:

$$R_{1f}=A_{1sa}/(2\times A_{1pa}); \text{ and}$$

a second mold having mold parts for joining together to define a separate second mold chamber for receiving a portion of the moldable parison to blow mold the second manufactured article, and at least one waste article forming chamber adjacent to and connecting with at least a portion of said second mold chamber for receiving a portion of the moldable parison and forming at least one separable waste article simultaneously with the blow molding of said second manufactured article, said waste article forming chamber being of a size and shape selected such that the second manufactured article and a waste article have a total surface area $A_{2sa}$ and said second mold chamber and waste article forming chamber have a total parting line area $A_{2pa}$, said second mold and waste article forming mold having a second mold forming ratio $R_{2f}$ as follows:

$R_{2f} = A_{2sa}/(2 \times A_{2pa})$; and $R_{2f}$ being between about 90% to about 110% of $(R_{1f} \times R_{sag})/R_{wall}$, where $R_{sag}$ represents a weight ratio determined by the weight of a parison section being blow molded to form said first manufactured article divided by the weight of a parison section being blow molded to form said second manufactured article and waste article, and where $R_{wall}$ represents a ratio of a desired wall thickness of the second manufactured article divided by a desired wall thickness of the first manufactured article.

13. A family of molds in accordance with claim 12 wherein said second mold chamber has a perimeter, and said waste article forming chamber surrounds the entire perimeter of the second mold chamber.

14. A family of molds in accordance with claim 12 wherein said second mold chamber defines a second manufactured article having corner areas and a wall area extending between the corner areas, and said at least one waste article forming chamber is adjacent to and connected with said wall defining area of said second mold chamber.

* * * * *